Luce & Green,
Stone-Channeling Machine,
No. 85,317. Patented Dec. 29, 1868.
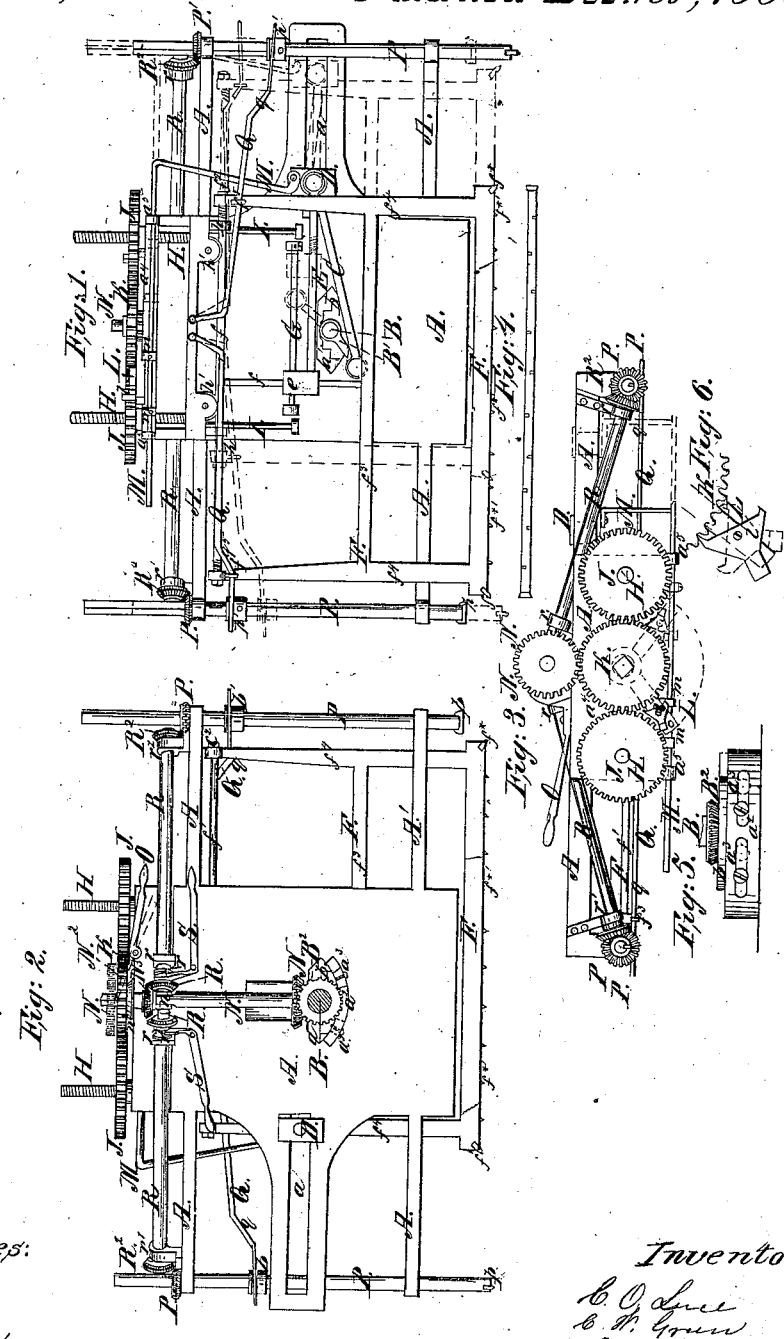
Witnesses:
Inventors:

United States Patent Office.

CURTIS O. LUCE AND CYREL W. GREEN, OF BRANDON, ASSIGNORS TO THEMSELVES AND CYRENIUS M. WILLARD, OF CASTLETON, VERMONT.

Letters Patent No. 85,317, dated December 29, 1868.

IMPROVED STONE-QUARRYING MACHINE.

The Schedule referred to in these Letters Patent and making part of the same.

*To all whom it may concern:*

Be it known that we, CURTIS O. LUCE and CYREL W. GREEN, both of Brandon, in the county of Rutland, and State of Vermont, have invented a new and useful Improvement in Machines for Quarrying Stone; and we do hereby declare the following to be a full, clear, and exact description thereof, reference being had to the accompanying drawing, which is made a part of this specification.

The subject of our invention is a machine for sawing marble, slate, rock, mica, and other like minerals, consisting of one or more saws and drills, having their cutting-edges composed of diamonds or other very hard substances, mounted in a suitable adjustable frame, and operated and fed by a novel and simple arrangement of devices.

In the drawing—

Figure 1 represents a front elevation of our improved machine;

Figure 2 is a rear elevation thereof; and

Figure 3 is a plan view thereof.

Figure 4 is a face view of the saw detached, and

Figures 5 and 6 are detached views of details hereinafter more particularly referred to.

A may represent a plate or frame, of suitable form to afford bearings for the different working-parts, and adapted, by any suitable means, for attachment to the rock, or to the frame of the engine, or other suitable support.

B is a horizontal shaft, mounted in a bearing, $b$, in said plate, and provided on its outer end with a crank or other medium, through which it receives a continuous rotary motion from the engine or other motor.

It also carries, on the front side of the plate A, a crank, $B^1$, connected by means of a rod, C, to a slide, D, working in a horizontal slot, $a$, in the plate, and which is further connected, by a rod, E, to the saw F, thus imparting to it, by the rotation of the shaft B, a constant reciprocating motion.

The connecting-rod E is coupled to the saw by means of a block, $e$, attached to it by means of a screw-joint, and perforated vertically for the reception of the rod $f$ of the saw-frame, and horizontally for the reception of a guide-bar, G, rigidly attached to the plate A, which bar serves to confine the saw to a horizontal path.

The upper bar $f^1$, of the saw-frame, is screw-threaded at one of its ends, and provided with a nut, $f^2$, by which to tighten the blade F', which, together with the fulcrum-piece $f^3$ and end-pieces $f^4$, may be made of one piece of iron, or other metal.

The teeth of the saw consist of diamonds, or similar hard substances, inserted in its face in the manner represented in figs 1, 2, and 4.

The principal cutters $f^*$ $f^*$ project from the respective lower corners of the blade, so as to adapt the saw to cut in both directions, and are of the same or a greater width.

The intermediate cutters $f^*$ may, if preferred, be arranged alternately on opposite sides of the face, at suitable intervals between those points.

The plate A is provided, for the reception of the bearing, $b$, of the driving-shaft, with a segmental aperture, $a^1$, the extended bottom of which forms an outwardly-projecting flange, $a^2$, having formed in it slots $a^3$ $a^3$, for the reception of the attaching-bolts of said bearing, as represented in figs. 1, 2, and 4, in which latter figure an under-side view of said plate is shown. By this means the position of the driving-shaft may be readily adjusted to any desired extent, and thus, through its connections, cause the saw to cut more or less on either side of the centre.

H is a cross-head or presser-bar, employed to transmit the necessary feeding-movement to the saw.

It is confined to a vertical path by means of guide-rods I, and provided with lugs $h$, for the reception of the bar $f^1$ of the saw-frame, and also with grooved friction-rollers $h'$, which bear on said bar inside of the lugs $h$.

H' H' are screw-rods, projecting upward from the cross-head H, which, passing through the flange $a^4$ of the plate A, are engaged by gear-nuts J J, seated on said flange, and connected by an idle-wheel, K.

L is a swinging arm, pivoted on the hub of the wheel K, and carrying, at its outer end, a spring-reversible pawl, $l$, which meshes with the teeth of said wheel, and imparts to it, at every stroke of the saw, a partial revolution, corresponding with the length of its stroke.

M is a bent rod, which is attached to the slide D, and, projecting upward therefrom, occupies bearings $a^5$ $a^5$, projecting from the face of the flange $a^4$.

$m$ $m$ are collars, provided on said rod, in suitable position to engage with the arm L, and impart to it the requisite movement, being adjustable, to vary the amount of this movement, by set-screws, in the ordinary manner.

N is a vertical shaft, stepped in the bearing $b$, and provided with a bevel-wheel, $N^1$, meshing with one, $B^2$, on the shaft B.

It is provided with a universal joint, $u$, to allow of the described adjustment of the bearing $b$, and carries at its upper end a sliding pinion, $N^2$, which meshes with and drives the wheel K, when desired, but is capable of being elevated out of gear with said wheel, as represented in red in fig. 2, by means of a fork, O, pivoted to the plate A in convenient position, and embracing the grooved hub $u^2$ of said pinion.

When the gears $N^2$ and K are in mesh, the pawl $l$ is thrown out of contact with the wheel K, or the operation of said wheel by it stopped in other suitable manner, and a constant rotary motion is imparted to the nuts J through the gearing, and when the intermittent motion is preferred, the pawl $l$ being made to engage with the wheel K, and the pinion $N^2$ thrown out of gear, said motion is imparted to them, as before described.

P P are drills, having their cutting-edge $p$ formed similarly to those of the saw F.

They slide in suitable vertical ways formed by the arms or brackets A' of the plate A, and receive both a rotary and reciprocating motion, as hereinafter described.

Q Q are cam-rods, pivoted to the cross-head H near its centre, as represented in fig. 1, and extending through loops $f^3 f^5$, on the end-pieces $f^4$ of the saw-frame, engage with grooved collars $p'$ on the drills, the vertical adjustment of which collars determines the relative depth at which the drills shall cut.

It will be seen that the vertical feeding-movement of the head H and saw F will be imparted to the drills in the same degree, while, by the horizontal reciprocation of the saw, by means of the cam-surfaces $q$ of said bars, the necessary vertical reciprocation of the drills will be effected.

R R are shafts, mounted in bearings $r r'$ at the top of the plate or frame A, in the position represented in fig. 3, and provided on their converging ends with sliding bevel-pinions $R^1$, meshing with a bevel-pinion, $N^3$, on the shaft N, and on their other ends with bevel-pinions $R^2$, which mesh with similar ones, P', on the drills, and thus impart to them a constant rotation while the pinions $R^1$ and $N^3$ are in gear.

The pinions P' are connected to the drills, by means of a spline occupying a longitudinal groove in the drills, so as to allow their described vertical movement.

The pinions $R^1$ are provided with grooved hubs $r'$, which are engaged by forks S, pivoted to the plate A, as shown in fig. 2, by means of which they may be readily thrown out of gear when desired, so as to stop the rotary movement of either or both of the drills.

We propose providing the plate or frame with any suitable adjustment, to admit of its being attached at a proper angle to suit the ledge in which it is working, and, when attached directly to the rock, making said attachment by means of tapered bolts inserted in perforated blocks or pins of wood, or other soft material, inserted in suitable holes drilled in the rock, which blocks are, by the action of the screw, expanded, and a most secure fastening thus obtained. This mode of attachment may also be used for other purposes for which it is adapted.

We also propose running a gang of saws instead of a single one, as represented, and increasing the number of, or dispensing entirely with, the drills, when preferred.

The machine may receive its motion from a suitable engine or other power, either stationary or portable, located either within or outside of the pit, and the necessary supply of water for the saws may be readily conducted to them from the engine, when such is used.

Some parts of our invention are manifestly applicable to the sawing of blocks of marble or other material, after the same have been removed from the pit or quarry.

Having thus described our invention, the following is what we claim as new therein, and desire to secure by Letters Patent:

1. We claim the reciprocating saw F, provided with diamond teeth $f^*$ and $f^{*1}$, arranged substantially in the manner described.

2. We claim constructing the saw-blade $F^1$, with rigid ends projecting beyond the end-bars $f^4$ of the frame, substantially as represented.

3. We claim the combination of a reciprocating saw F, with a drill or drills, P, employed to free the ends of the saw-kerf or channel, substantially as described.

4. We claim the combination of the driving-shaft B, mounted in an adjustable box or bearing, $b$, the crank B', connecting-rods C E, slides E $e$, and guide-rod G, with the saw F, all constructed and operating substantially as described, for the purposes specified.

5. We claim the combination of the saw F $f f'$, cross-head H $h h'$, screws H', vertical guide-rods I, gear-nuts J, idle-wheel K, and ratchet-lever L $l$, or its equivalent, substantially as and for the purpose described.

6. We claim, in combination with the drills P, the shafts B N R, bevel-gearing $B^2$, $N^1 N^3$, $R^1 R^2$, P', and forks S, for the purpose of adapting said drills to receive a continuous rotary motion, or be separately stopped, substantially as set forth.

7. We claim, in combination with the revolving drills P, the cam-bars Q $q$, operated by means of the saw F and presser-bar H, in the manner described, to reciprocate and feed said drills.

CURTIS O. LUCE.
CYREL W. GREEN.

Witnesses:
J. Q. HAWKINS,
W. M. LINCOLN.